(12) United States Patent
Sickinger et al.

(10) Patent No.: US 10,466,091 B2
(45) Date of Patent: Nov. 5, 2019

(54) PRODUCT OUTPUT DEVICE

(71) Applicant: MULTIPOND Wägetechnik GmbH, Waldkraiburg (DE)

(72) Inventors: Günther Sickinger, Ampfing (DE); Joseph Schmidhuber, Kraiburg (DE); Andreas Peters, Aschau am Inn (DE); Felix Profe, Winhöring (DE)

(73) Assignee: MULTIPOND WÄGETECHNIK GMBH, Waldkraiburg (DE)

( * ) Notice: Subject to any disclaimer, the term of this patent is extended or adjusted under 35 U.S.C. 154(b) by 125 days.

(21) Appl. No.: 15/656,532

(22) Filed: Jul. 21, 2017

(65) Prior Publication Data

US 2018/0023997 A1  Jan. 25, 2018

(30) Foreign Application Priority Data

Jul. 22, 2016  (EP) .................................... 16180751

(51) Int. Cl.
*G01G 13/18* (2006.01)
*G01G 13/24* (2006.01)
*B65B 39/00* (2006.01)

(52) U.S. Cl.
CPC ......... *G01G 13/247* (2013.01); *B65B 39/002* (2013.01); *G01G 13/18* (2013.01); *G01G 13/242* (2013.01); *B65B 39/004* (2013.01)

(58) Field of Classification Search
CPC ...... G01G 13/16; G01G 13/18; G01G 13/247; G01G 13/242; G01G 19/387; G01G 19/393; B65B 39/00; B65B 39/004

USPC ........................................................ 177/105
See application file for complete search history.

(56) References Cited

U.S. PATENT DOCUMENTS

| | | | | |
|---|---|---|---|---|
| 2,963,258 A | * | 12/1960 | Stambera ............... | G01G 21/00 177/105 |
| 3,400,775 A | * | 9/1968 | Mackenzie .............. | B64G 1/22 177/108 |
| 4,393,950 A | * | 7/1983 | Klopfenstein ..... | G01G 13/2958 177/108 |

(Continued)

FOREIGN PATENT DOCUMENTS

| EP | 0 979 393 B1 | 11/2000 |
|---|---|---|
| EP | 1 184 648 B1 | 5/2003 |

(Continued)

*Primary Examiner* — Randy W Gibson
(74) *Attorney, Agent, or Firm* — Womble Bond Dickinson (US) LLP; John J. Penny, Jr.

(57) ABSTRACT

A product output device for a product supply system, in which a first product supply device and a second product supply device provide product amounts in a first collecting container and a second collecting container. Both collecting containers are provided with respective first closure flaps and second closure flaps. As soon as the collecting containers are positioned above the product receiving device, the closure flaps can open in order to drop the product into the product receiving device. The collecting container, comprising the first collecting container and the second collecting container, can be pivoted to an output position of the first collecting container, or to a output position of the second collecting container. Herein, the pivoting movement to the respectively different output positions begins before the first closure flaps have closed.

13 Claims, 9 Drawing Sheets

(56) References Cited

U.S. PATENT DOCUMENTS

| | | | | | |
|---|---|---|---|---|---|
| 4,527,647 | A | * | 7/1985 | Ueda | G01G 13/18 108/108 |
| 4,531,598 | A | * | 7/1985 | Kitagawa | B65B 39/002 177/105 |
| 4,549,621 | A | * | 10/1985 | Ueda | G01G 13/00 177/105 |
| 4,566,549 | A | * | 1/1986 | Oshima | B08B 5/02 177/245 |
| 4,901,807 | A | * | 2/1990 | Muskat | G01G 19/393 177/199 |
| 4,947,946 | A | * | 8/1990 | Konishi | G01G 13/02 177/105 |
| 5,324,894 | A | * | 6/1994 | Chen | G01G 13/16 177/112 |
| 6,286,717 | B1 | * | 9/2001 | Schmidhuber | G01G 13/16 141/248 |
| 6,607,098 | B2 | * | 8/2003 | Yamamoto | G01G 13/18 222/166 |

FOREIGN PATENT DOCUMENTS

| | | |
|---|---|---|
| GB | 232 354 A | 4/1925 |
| JP | 60-148937 U | 10/1985 |

* cited by examiner e-1)  e-2)  f-1)  f-2)

g-1)  g-2)  h-1)  h-2)

PRODUCT OUTPUT DEVICE

CROSS REFERENCE TO RELATED APPLICATION

Priority is claimed under 35 U.S.C. § 119 to EP 16 180 751.6 filed on Jul. 22, 2016, which is hereby incorporated by ref in its entirety.

BACKGROUND

The present application relates to a product output device for a product supply system.

When filling empty packagings, as for example sachets, beakers, tins or the like, modern packaging machines work with that high speed that it is hardly possible any more to fill the packaging containers to be filled in the short available time reliably with certain product amounts, which are, for example, obtained by weighing, counting, time-controlled dosing or the like. In order to provide product amounts which are to be filled into the packaging containers, for example a respective number of conventional filling scales or a combination scale is/are used. In both cases, the product amounts ejected from the spatially separated weighing containers of the conventional scales or of the combination scale have to be fed to the filling point of the packaging machine.

EP 0 979 393 B1 describes a product output device with movable collecting containers. With this system, product amounts weighed in a weighing system are distributed to a first and a second product supply device. Below those, a respective first collecting container and a respective second collecting container are positioned, which are respectively provided with closure flaps. Below the collecting containers, a product receiving device is provided which leads into a respective packaging machine. Herein, the weighing system can output weighed product amounts to the first or the second product supply device. These product amounts are then collected by the collecting containers with closed closure in a way that the product amounts, which are uncompressed by the wall of the collection chute, are collected via a tapering interior space in a compact form again. The collecting containers are aligned in a way that the ejection opening of a respective collection chute is positioned in the direction of the gravitation accelerations always within the circumference of the upper opening of the collecting container, such that they can receive a weighed product amount, which is ejected by the weighing system in their ejection position above the product receiving device and in a different position. In a respective position, the product amounts contained in the collecting containers are ejectable into the product receiving device by opening the respective closure flaps.

EP 1 184 648 B1 discloses a similar product output device which is additionally provided with a device for opening of the closure flaps. Herein, the opening and the closing of the closure flaps is variably selectable depending on the position of the collecting containers (those are pivoted around an axis). In this way, it can be ensured that the closure flaps of the collecting containers open or close depending on the situation—if products are ejected from the product supply device, the closure flaps are respectively closed, however, if one of the collecting containers is located in the ejection position above the product receiving device, the flaps can be opened, so that the product can be ejected in a compact manner.

From such systems, however, two basic problems arise:

On the one hand, it has to be waited until a complete product amount has left one of the collecting containers. Only then, the tilting movement of the collecting containers can begin. Otherwise, the product would be displaced by the closure flaps. A transfer of the complete product portion to the product receiving device would then not be guaranteed any more. By collision with the walls of the product receiving device, the product is furthermore decelerated via friction.

A product amount is thereby uncompressed. For this reason, a clear separation with regard to the next portion is only possible with longer time intervals between the single portions. Hence, the performance of such a plant is low.

A further problem derives, as the pivoting process of the collecting containers can only begin after the closing of the closure flaps of the collecting containers. Hence, said pivoting process max only consume a preferably short time in order to realize a respectively desired—although low—performance of the plant. Pivoting of the collecting containers has hence to be performed with very high velocities, being the reason why high accelerations can occur both in the beginning and at the end of the pivoting process. A respective drive for pivoting of the collecting containers has to be respectively designed, which, in turn, can have strong retro-active effects on the system, for example in the form of unrest, fluctuations and impacts. Because of the high dynamic loads occurring hereby, the system requires a respectively high stiffness. This compulsorily leads to massive, heavy components.

SUMMARY

It is hence an objective technical problem of at least one embodiment of the present invention to provide a product output device which solves the above-mentioned problems.

At least one embodiment of the invention includes a product output device, comprising a first product supply device with a respective first collecting container and a second product supply device with a respective second collecting container. The first and the second collecting container are coupled mechanically with each other and respectively comprise a pair of closure flaps at their bottom ends. The collecting containers can output the supplied product amounts to a product receiving device with a preset opening cross-section. Herein, each of both collecting containers respectively comprises an output position for outputting of a supplied product amount. The collecting containers per se are pivotable around an axis and are hence bringable into outputting positions. However, by contrast to the state of the art, the opening and the closing direction of the closure flaps is configured in a way that they are movable out of the pivoting path of the collecting containers via their opening movement, without colliding with the product during pivoting. Preferably, the opening and the closing direction of the closure flaps is perpendicular to the pivoting direction of the collecting containers. For realizing of the pivoting movement and the opening and the closing movement of the closure flaps, a central drive with a pivoting drive and a flap drive is coupled mechanically.

The inventive solution of the problem comprises several advantages.

At first, it is hence possible to begin the pivoting of the collecting containers when the closure flaps of the respective container are still open, as the product, which is located between the closure flaps, can continue its falling path between the closure flaps without hindrance. There is no contact with the closure flaps, and hence no friction and no displacement of the product occurs. Hence, a higher outputting performance of the product outputting device is realizable.

Furthermore, at least one embodiment of the present invention allows that the pivoting movement of the collecting containers can be carried out more slowly—compared to the prior art at the same cyclic output. Hence, smaller accelerations are sufficient, leading to a smaller required driving performance of the central drive. Hence, the drive has a smaller influence on the remaining system. Strong retro-active effects in the form of unrest, fluctuations and impacts can hence be avoided. Because of the lower accelerations, lower dynamic loads are obtained. Hence, a lower stiffness of the system is required, being the reason why the components can be designed in a lighter manner.

Furthermore, a system according to at least one embodiment of the present invention is less noisy compared to the prior art. This is enabled because of said lower accelerations which appear because of an earlier beginning of the pivoting movement (before the closure flaps of the collecting containers close).

Furthermore, preferably pre-stressed torsion springs, which close the closure flaps again, contribute to the fact that any desired adjustability is present, depending on the size and the dimensions of the closure flaps and/or the product. Compared to tension springs, this solution is more hygienic, as it is more easily cleanable and is protected better from other mechanical influences.

By a preferably suitable choice of materials (aluminum and its alloys, magnesium and its alloys, titanium, carbon fiber-reinforced polymer, composite materials and other light materials), the present solution further leads to a lower mass of the moving system.

In the following, preferred embodiments are described more in detail with reference to the enclosed figures.

Herein, the individual steps a) to h) of a product transfer are depicted in the figure. Of each of said steps, a side view (sub-figures a-1, b-1, c-1, d-1, e-1, f-1, g-1, h-1) and a cross-sectional view (sub-figures a-2, b-2, c-2, d-2, e-2, f-2, g-2, h-2) are presented.

Figure 2A:
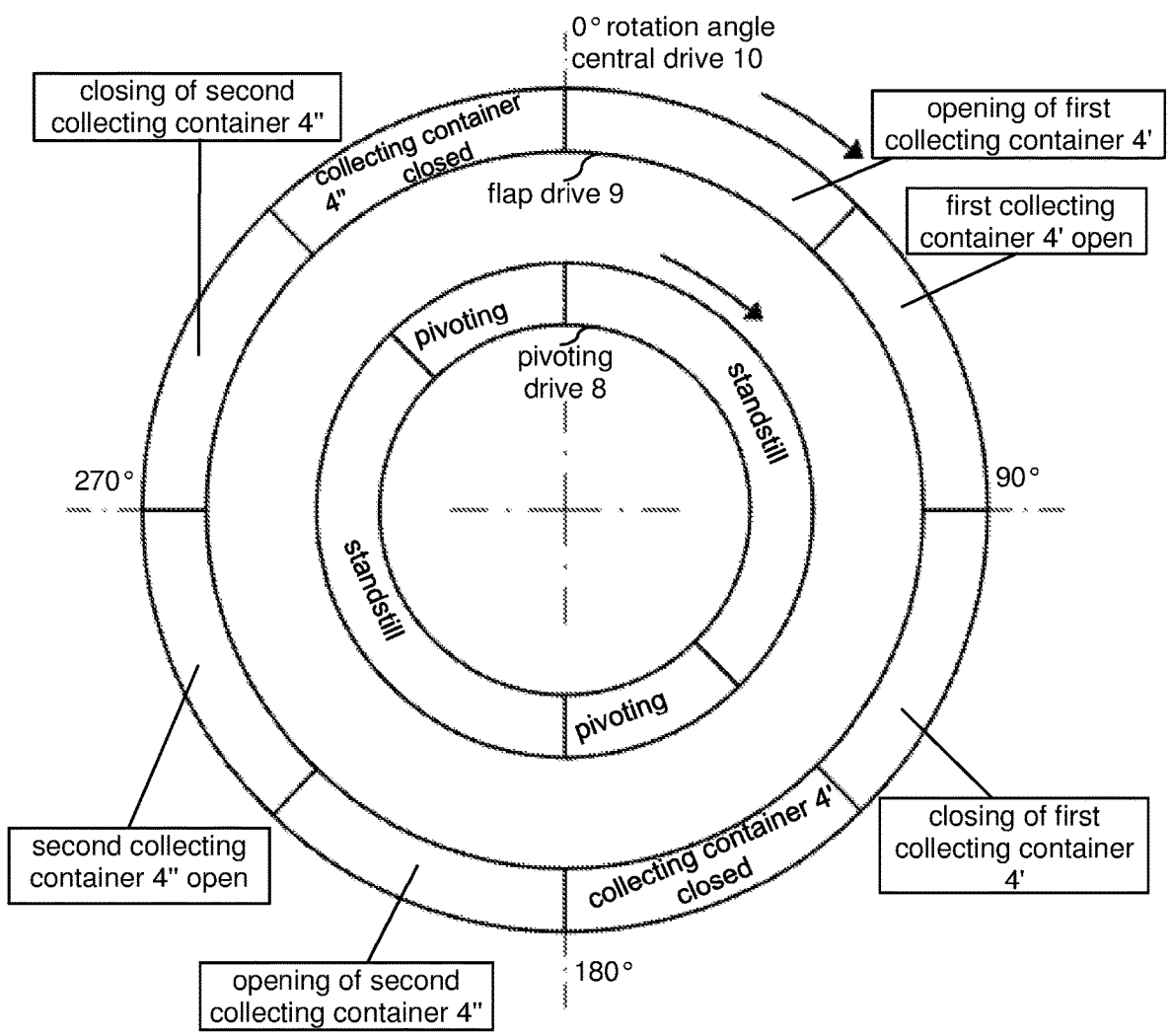
Figure 2B:
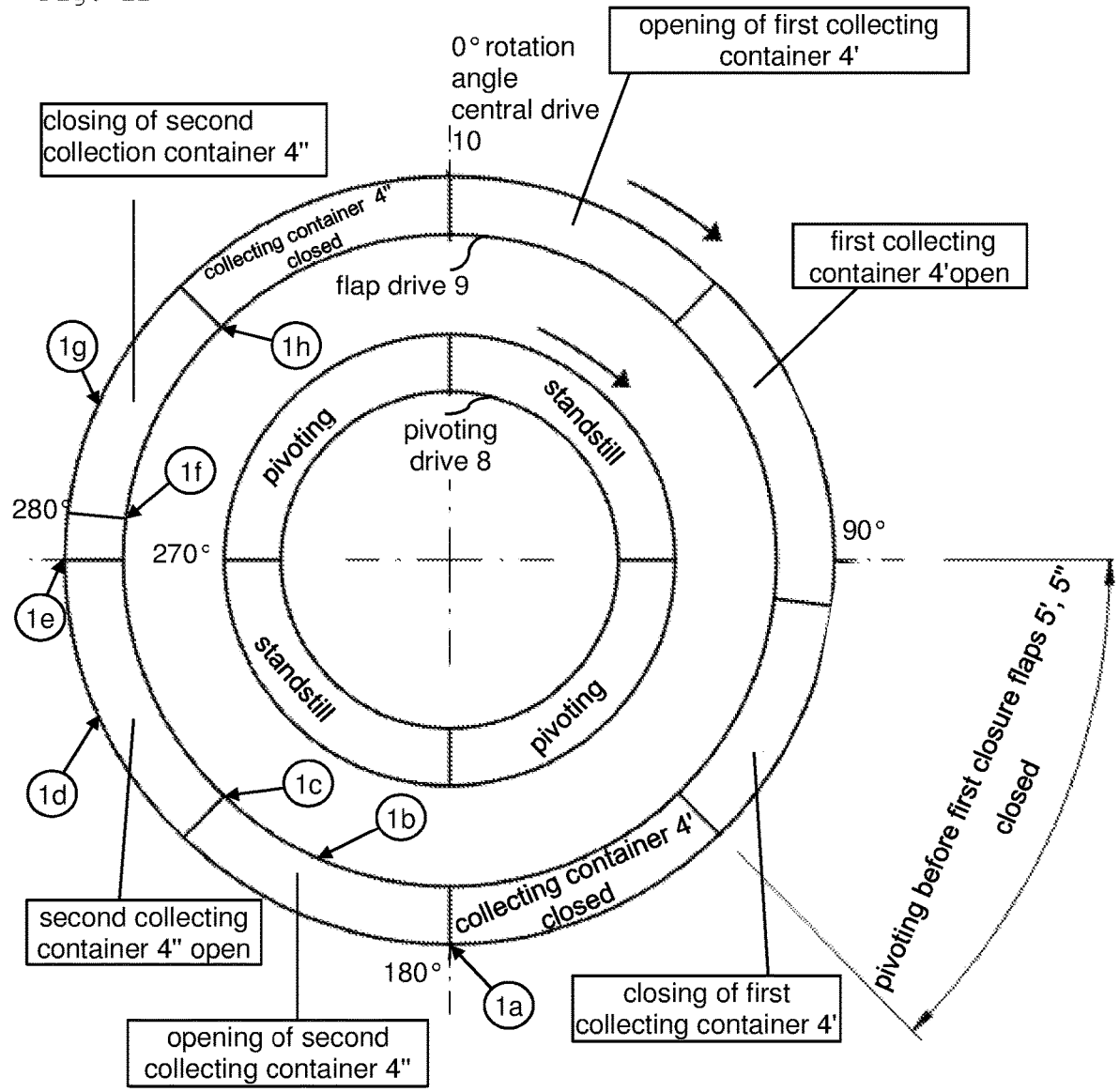

FIG. 2 shows a scheme of the positions of three drives (central drive, pivoting drive and flap drive) depending on the rotation angle. Herein, FIG. 2A shows a scheme according to the prior art, and FIG. 2B shows a scheme according to at least one embodiment of the present invention.

Figure 3:
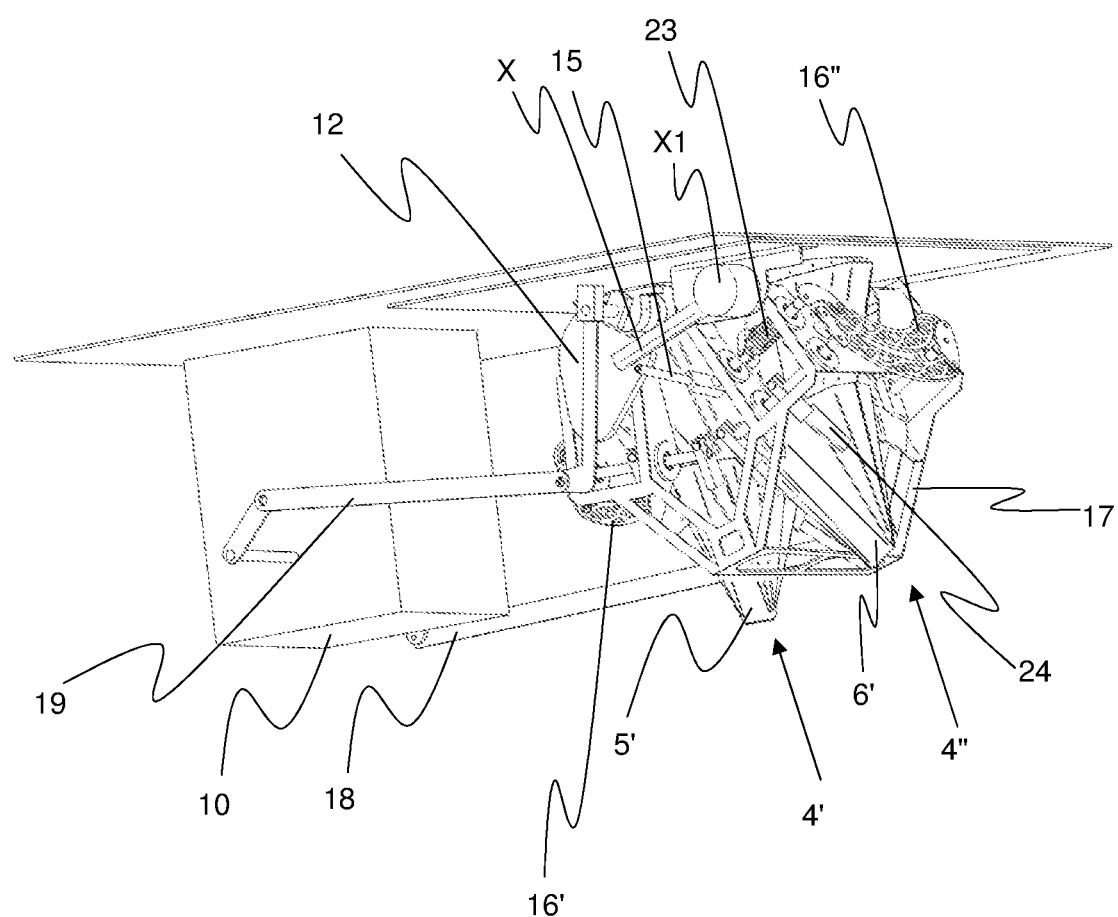

FIG. 3 shows parts of a product output device according to a preferred embodiment with a cam disk controlling the movement of the closure flaps, in addition containing an ejection device. In FIG. 3, in particular the collecting containers with the closure flaps and the components of the drives are presented.

Figure 4:
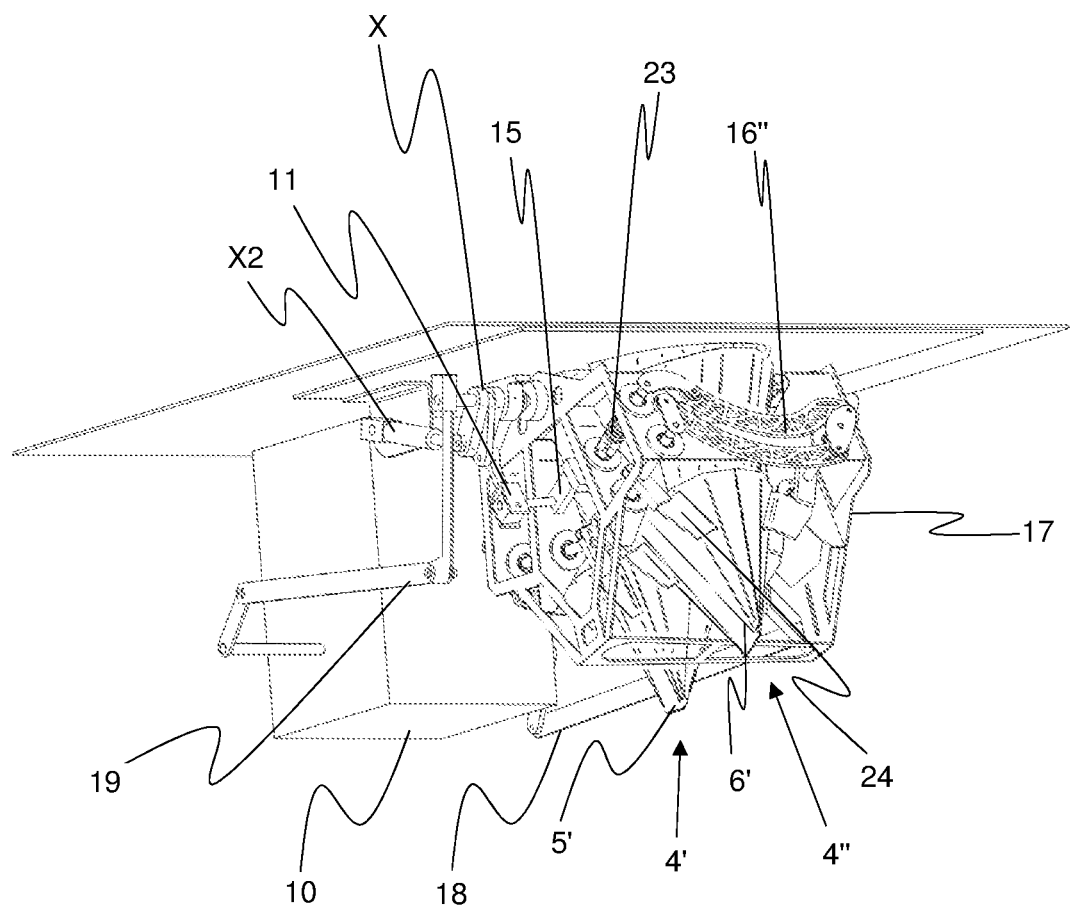

FIG. 4 shows parts of the product output device according to a further preferred embodiment with a cardan joint controlling the movement of the closure flaps, in addition containing an ejection device. In FIG. 4, also the collecting containers with the closure flaps and the components of the drives are presented.

Figure 5:
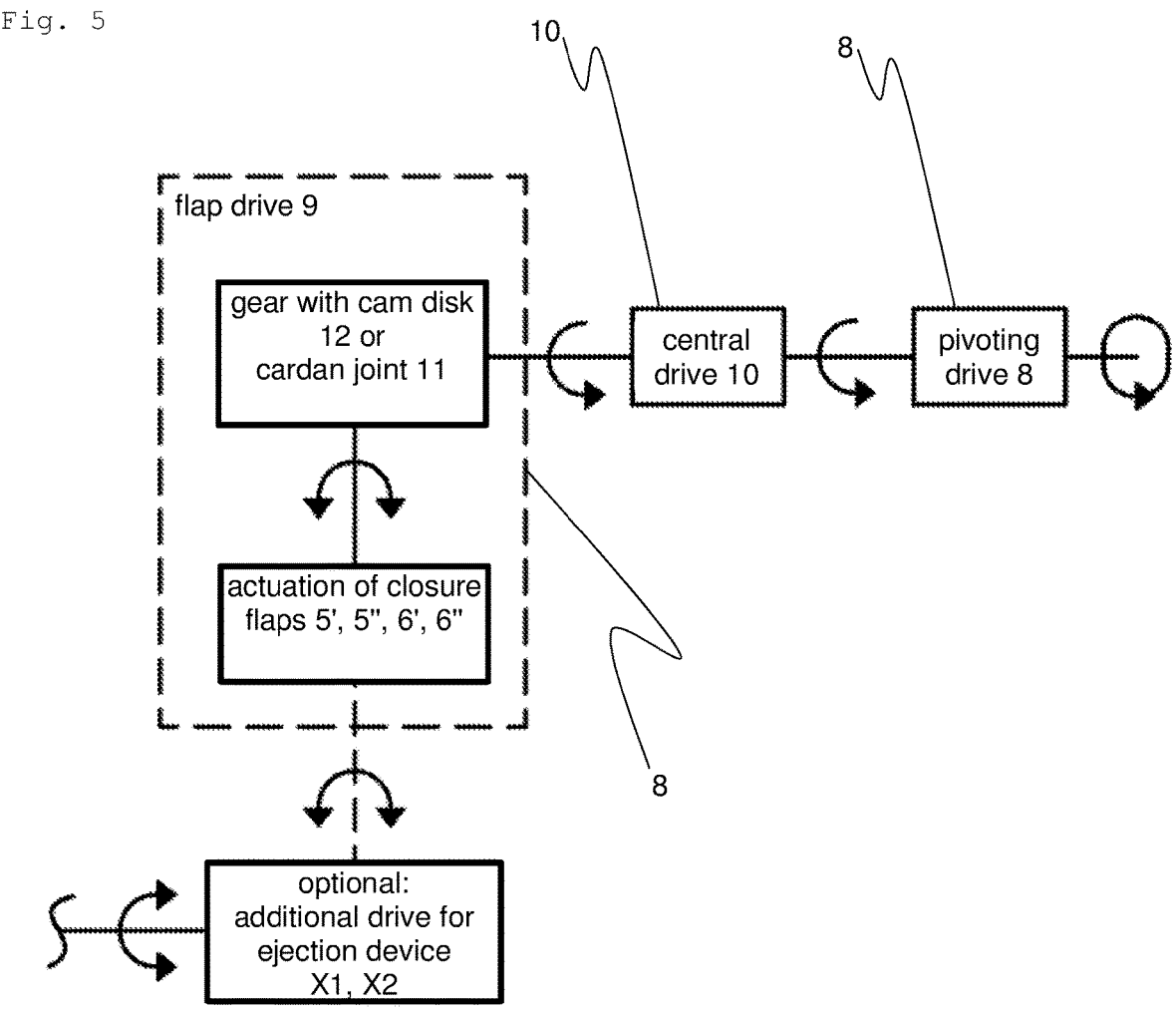

FIG. 5 schematically shows the coupling of the drives (central drive, flap drive and pivoting drive, and optionally an additional drive for an ejection device).

Figure 6:
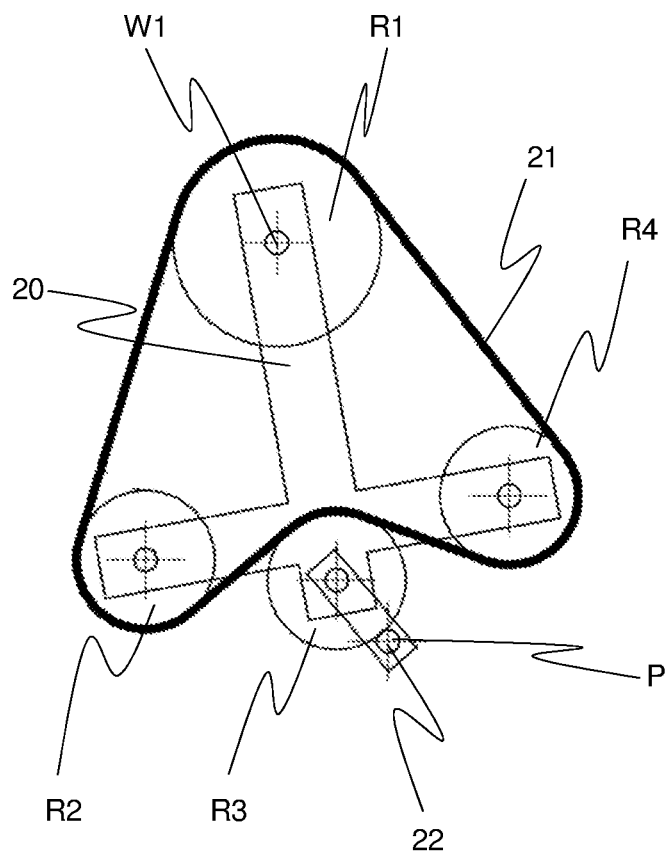

FIG. 6 shows the structure of the pivoting drive, which is provided as a standstill gear in the present embodiment.

Figure 7:
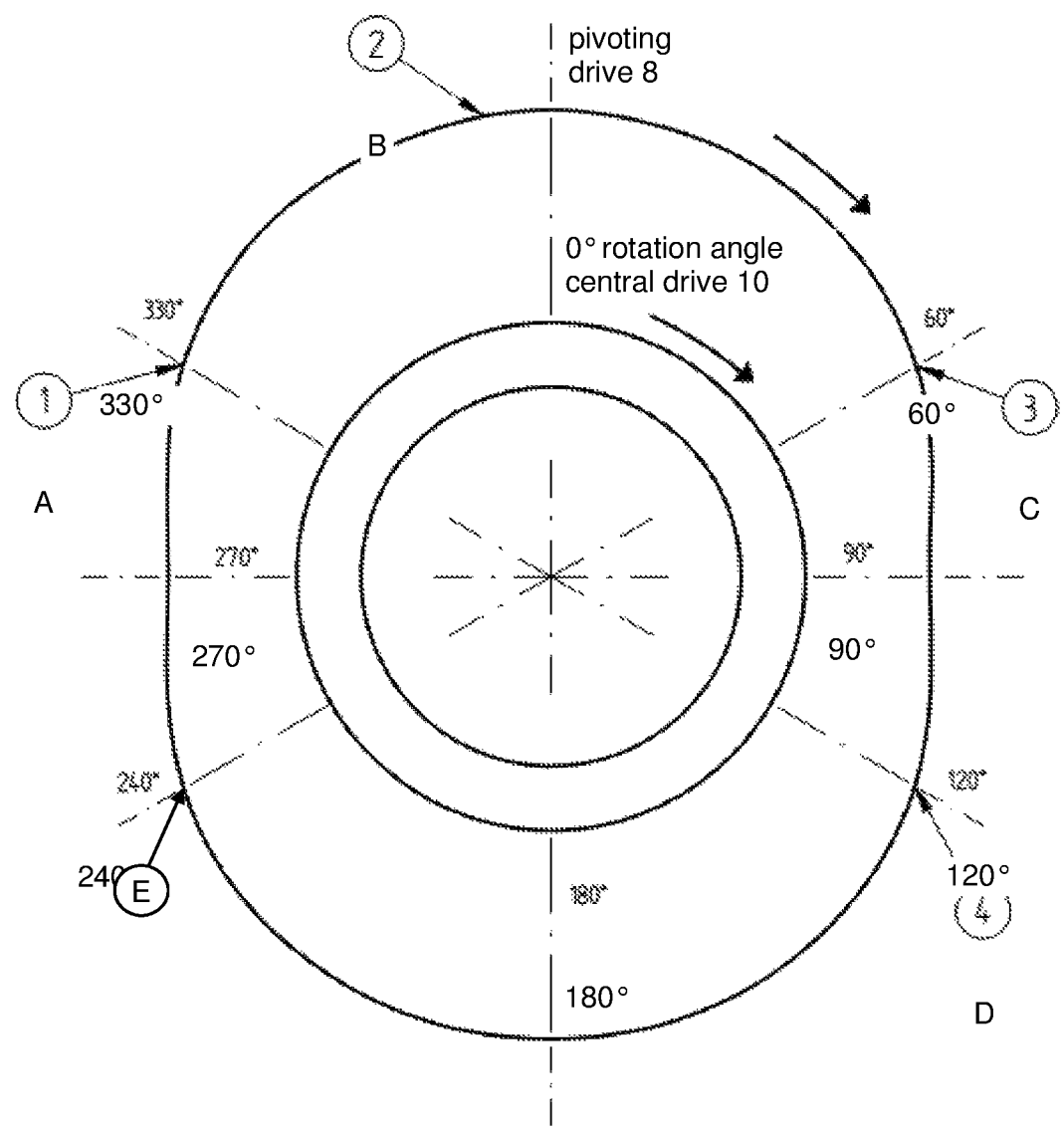

FIG. 7 shows a procedure curve of the standstill gear in point P of FIG. 6.

DETAILED DESCRIPTION

Figure 1:
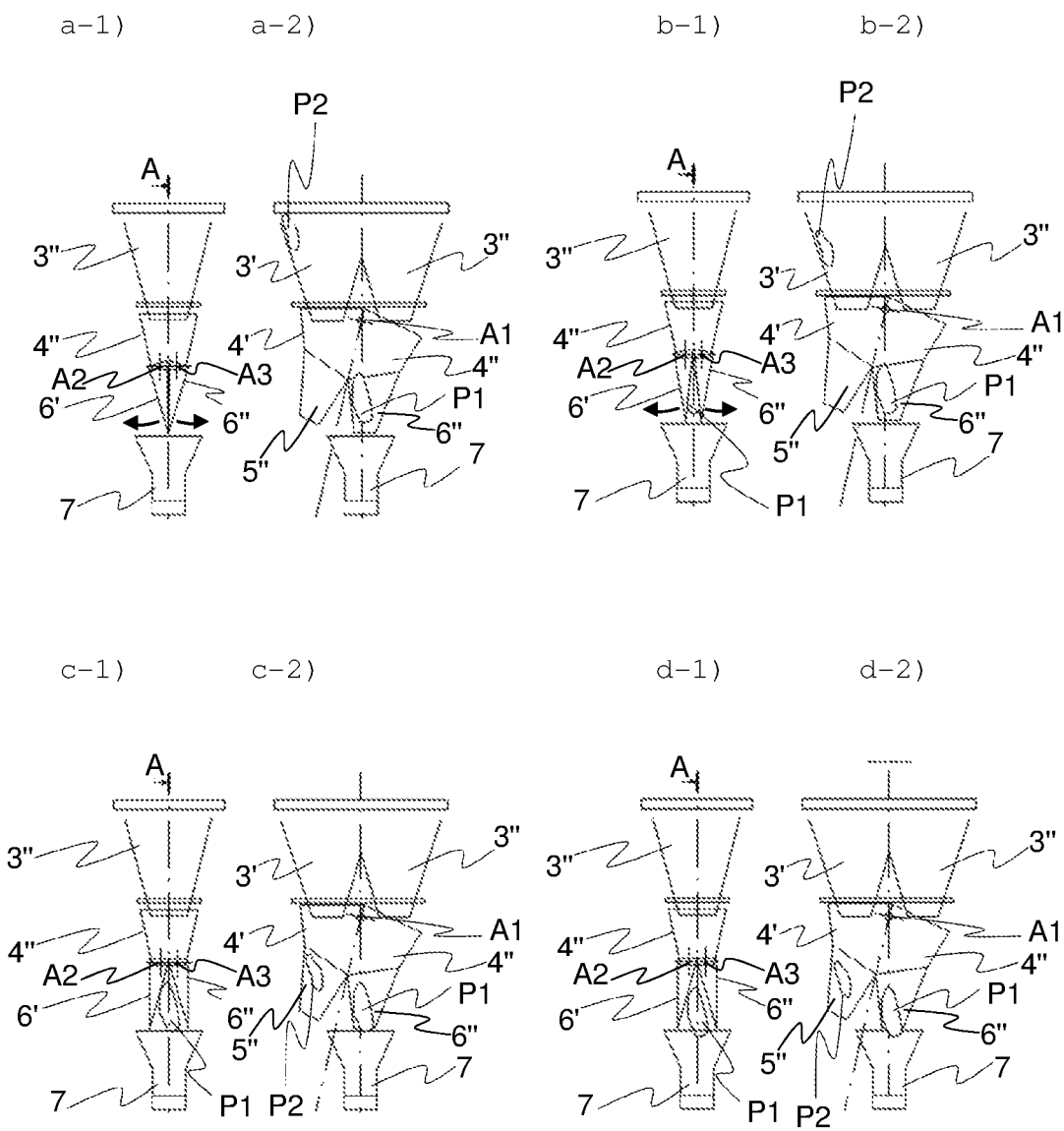
FIG. 1 schematically shows the transfer of the product to the product receiving device assisted by the product supply device, the collecting containers and closure flaps.
Figure 1:
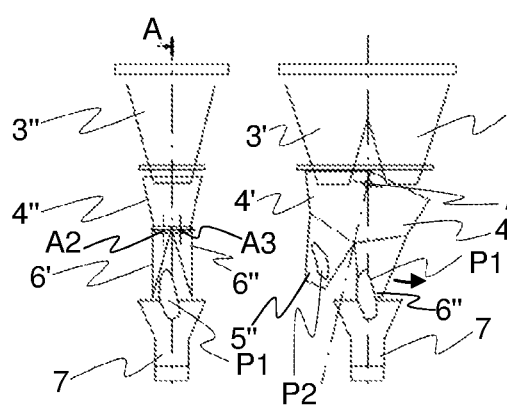
Figure 1:
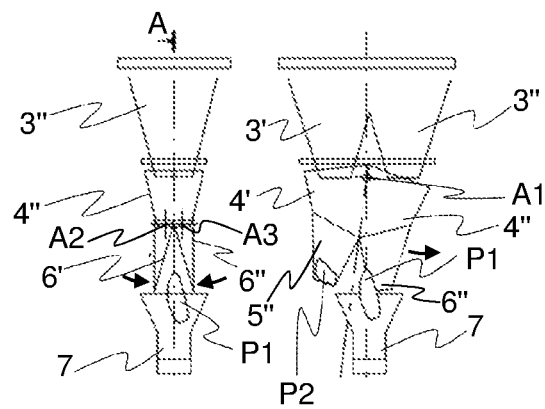
Figure 1:
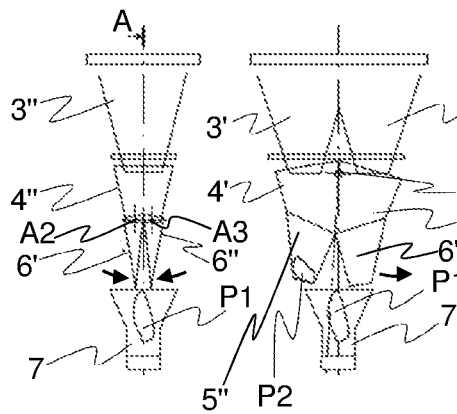
Figure 1:
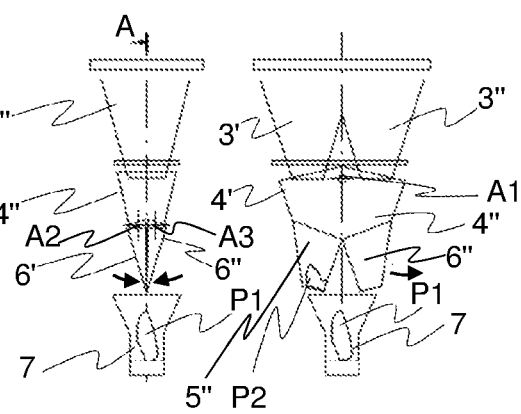

FIG. 1 shows the process of a product output of a product output device 1 with the product output of the product amounts P1 and P2. A side view and a cross-sectional view of the assembly consisting of product supply devices 3', 3", collecting containers 4', 4" and closure flaps 5', 5" and 6', 6" are respectively presented. Furthermore, it is illustrated that the pivoting movement of the collecting containers 4', 4" is perpendicular to the opening and closing direction of the closure flaps 5', 5" and 6', 6", as a pivoting axis A1 is perpendicular to the closure flap axes A2 and A3 of the closure flaps 6', 6" and the closure flap axes A4 and A5 (not shown in FIG. 1) of the closure flaps 5', 5". The closure flaps 5', 5" and 6', 6" move to the outside and to the upper direction in the direction of the collecting container 4' and 4", when they open. Herein, the opening direction is perpendicular to the pivoting direction.

Herein, FIG. 1 a) shows a state in which the second collecting container 4" is positioned centrally above the opening of the product receiving device 7. A product amount P1 is already within the second closure flaps 6', 6" of the second collecting container 4". The second closure flaps 6', 6" are in a closed state. Further above in the first product supply device 3', there is a second product amount P2 at the wall, which slides down along the wall.

In FIG. 1 b), a state is shown in which the second closure flaps 6', 6" of the second collecting container 4" open. At the pivoting position of the first collecting container 4' and second collecting container 4", nothing has changed compared to FIG. 1 a). The product amount P2, however, has moved further down within the first product supply device 3' at its wall, but has not reached the first collecting container 4' yet.

In FIG. 1 c), the second closure flaps 6', 6" are completely open, so that the product amount P1 can move from the second collecting container 4" to the product receiving device 7. The second product amount P2 has also moved further down in the first collecting container 4'. With regard to the pivoting state of the first collecting container 4' and second collecting container 4", nothing has, however, changed.

In FIG. 1 d), the product amount P1 has moved further down and is now partially contained in the product receiving device 7.

In FIG. 1 e), the first product amount P1 has already completely left the area of the second closure flaps 6', 6". The pivoting process begins, while the second closure flaps 6', 6" of the second collecting container 4" are still open.

In FIG. 1 f), the pivoting process of the first collecting container 4' and the second collecting container 4" has already begun. Herein, it has to be considered that the second closure flaps 6', 6" of the second collecting container 4" are still open, before they begin to close, and the product amount P1 is still being ejected into the product receiving device 7. On the other side, the second product amount P2 has already completely arrived at the bottom of the first closure flaps 5', 5" of the first collecting container 4'.

In FIG. 1 g), the pivoting process has further continued, and the second collecting container 4" has moved away from the product receiving device 7 a little. The second closure flaps 6', 6" of the second collecting container 4" are closing.

The product amount P1 has already completely arrived in the product receiving device 7, while the second product amount P2 is still at the bottom of the first closure flaps 5', 5" of the first collecting container 4'.

In FIG. 1 h), the pivoting movement of the first collecting container 4' and the second collecting container 4" has further continued. Herein, the first collecting container 4' continues moving with its first closure flaps 5', 5" into the direction of the opening of the product receiving device 7. The second closure flaps 6', 6" of the second collecting container 4" are now entirely closed. The product amount P1 has further fallen down in the product receiving device 7, and with regard to the position of the second product amount P2, nothing has changed.

In FIG. 1, it is clearly visible that the pivoting process of the first collecting container 4' and the second collecting container 4" already begins before, in this case, the second closure flaps 6', 6" of the second collecting container 4" have begun to close.

FIGS. 2A and 2B present a synopsis of the single states of the pivoting drive 8 and a flap drive 9 for a changing rotation angle of a central drive 10 according to prior art and according to an inventive solution.

FIG. 2A describes the prior art (EP 0 979 393 B1). Between a rotation angle of the central drive 10 of 0° and approximately 45°, the pivoting drive 8 stands still, while the first closure flaps 5', 5" of the first collecting container 4' are opening. The complete opening is approximately achieved at a rotation angle of the central drive 10 of approximately 45°. With further rotation of the central drive 10, the pivoting drive 8 further stands still, and the first closure flaps 5', 5" of the first collecting container 4' are in the opened state. This is the case until reaching a rotation angle of the central drive 10 of 90°. At a rotation angle of the central drive 10 larger than 90°, the first closure flaps 5', 5" of the first collecting container 4' begin to close, the pivoting drive 8 further stands still. Only at a rotation angle of approximately 135° of the central drive 10, the closing of the first closure flaps 5', 5" of the first collecting container 4' has finished. At a state larger than 135° rotation angle of the central drive 10, the pivoting drive 8 begins pivoting the collecting containers 4', 4". The first closure flaps 5', 5" of the first collecting container 4' are in a closed state from this point of time. The pivoting is performed up to a rotation angle of the central drive 10 of 180°. At this rotation angle of 180°, the pivoting movement of the pivoting drive 8 stops, the pivoting drive 8 is again in the standstill state here. At a rotation angle of the central drive 10 of larger than 180°, the second closure flaps 6', 6" of the second collecting container 4" begin to open, this further continues up to a rotation angle of the central drive 10 of approximately 225°. The pivoting drive 8 is in a standstill state in this range. Between a rotation angle of approximately 225° and 270°, the second closure flaps 6', 6" of the second collecting container 4" are in an open state, the pivoting drive 8 is further in a standstill state. From a rotation angle of the central drive 10 of 270°, the second closure flaps 6', 6" of the second collecting container 4" begin closing, the closing movement has finished at a rotation angle of the central drive 10 of approximately 315°, the pivoting drive 8 is still in a standstill state. From a rotation angle of approximately 315° of the central drive 10, the second closure flaps 6', 6" of the second collecting container 4" are closed, and a pivoting movement of the pivoting drive takes place. This is finished when reaching of a rotation angle of 360° of the central drive 10 (corresponding to 0°).

FIG. 2B shows a scheme of a preferred embodiment. Herein, the states a)-h) of FIG. 1 are also presented.

At a rotation angle of 0° of the central drive 10, the pivoting drive 8 is in the standstill state, while the flap drive 9 begins to open the first closure flaps 5', 5" of the first collecting container 4'. From a rotation angle of approximately 45° of the central drive 10, the first closure flaps 5', 5" of the first collecting container 4' are open. This state is maintained up to a rotation angle of the central drive 10 of 90°. From this rotation angle of the central drive 10, the pivoting drive 8 begins pivoting the collecting containers 4' 4". The first closure flaps 5', 5" of the first collecting container 4', however, remain open up to an angle of approximately 100°. From a rotation angle of the central drive 10 of approximately 100°, the first closure flaps 5', 5" of the first collecting container 4' begin closing, the closing is finished at a rotation angle of the central drive of 135°. The pivoting of the pivoting drive 8 proceeds up to a rotation angle of the central drive 10 of 180°, while the container flaps are closed from a rotation angle of the central drive 10 of 135° and remain closed up to a rotation angle of the central drive 10 of 180°. At a rotation angle of the central drive between 180° and 270°, the pivoting drive 8 is in the standstill state again. Between a rotation angle of the central drive 10 of 180° and 225° the second closure flaps 6', 6" of the second collecting container 4" open. At a rotation angle of the central drive 10 between 225° and 280° both second closure flaps 6', 6" of the second collecting container 4" are in an open state. At a rotation angle of the central drive 10 of more than 280°, both closure flaps 6', 6" of the second collecting container 4" begin closing. Already from a rotation angle of the central drive 10 of 270°, the pivoting drive 8 already begins with a back-pivoting movement, which proceeds up to a rotation angle of the central drive 10 of 360° (corresponding to 0°). The second closure flaps 6', 6" of the second collecting container 4" are closed at a rotation angle of the central drive 10 of 315°, and this state is maintained up to a rotation angle of the central drive 10 of 360° (=0°). In FIG. 2B, all intermediate states a) to h) are presented with regard to the second collecting container 4", as also presented in FIG. 1.

As becoming clear when comparing FIG. 2A and FIG. 2B, the phases of the pivoting are significantly extended in the inventive solution according to FIG. 1 b), those respectively take one quarter of the rotation angle range of the central drive 10, whereas in the prior art according to FIG. 1 a), only ⅛ of the range is respectively covered.

FIG. 3 shows a first embodiment of the product output device, for which the flap drive is provided with a cam disk 12. The cam disk 12 can lead a lever 15 for moving of the second closure flaps 6', 6" and actuate them. A framework structure 16" is mechanically coupled with the lever 15 for moving of the second closure flaps 6', 6", which passes the force or the movement for opening and closing of the second closure flaps 6', 6". For supporting the opening and closing of the closure flaps 6', 6", there is further respectively provided a torsion spring 23 which has a certain pre-tension force in order to keep the second closure flaps 6', 6" in the closed state (in the toggle lever position). This torsion spring 23 takes the closure flaps 6', 6" also from an open state back to the closed state with the respective spring force.

The force application to the closure flaps 6', 6" occurs near to the respective centers of gravity by respective connection elements 24. Furthermore, the product output device 1 contains a frame construction 17 which supports the first collecting container 4' and the second collecting container 4" including their closure flaps 5', 5" and 6', 6". With regard to the pivoting movement, the first collecting container 4' and the second collecting container 4" are mechanically coupled with each other via this frame construction 17. Furthermore, it is visible from FIG. 3 that both a connection lever 18 for connecting the central drive 10 with a part of the pivoting drive 8 and a connection lever 19 for connecting the central drive 10 with one part of the flap drive 9 is present. In FIG. 3, it is furthermore visible that the opening direction of the first closure flaps 5', 5" and 6', 6" is perpendicular to the pivoting direction of the first collecting container 4' and the second collecting container 4".

A functionally identical actuation also exists for the first closure flaps 5', 5" (inter alia with a lever 14, not presented in FIG. 3).

Furthermore, an additional drive X1 for an ejection device X is presented in FIG. 3. The ejection device X allows opening the collecting container 4" which is not above the product receiving device, i.e. is pivoted to the side and is normally closed, in this position, made possible by the fact that the lever 15 for moving the second closure flaps 6', 6" can also be actuated by the ejection device X. Thereby, product which does not fit to the product receiving device due to different reasons can be ejected, for example for overfillings or partial portions which do not fit into combinations. Furthermore, a second ejection device does exist for the collecting container 4' (not presented in FIG. 3).

FIG. 4 shows a second embodiment of the product output device, wherein the flap drive is realized with a cardan joint 11. All further components correspond to those in FIG. 3. An additional drive X2 for an ejection device X is also presented, wherein the ejection device X can actuate the lever 15 for moving the second closure flaps 6', 6". The lever 14 for moving of the first closure flaps 5', 5" which is identical in construction (not shown in FIG. 4) can be actuated with the already mentioned second ejection device (also not presented in FIG. 4).

FIG. 5 shows a scheme of the drive. Herein, it is visible that the pivoting drive 8 is mechanically coupled to the central drive 10. Furthermore, the flap drive 9 is mechanically coupled to the central drive 10. This one can, as already described above, either be provided as a drive with cam disk or as cardan drive. Hence, the actuation of the closure flaps 5', 5" and 6', 6" is coupled to the drive with the cardan joint 11 or the cam disk 12. The combination of the three drives (pivoting drive 8, flap drive 9, central drive 10) hence serves as a control device 25 for the pivoting movement of the collecting containers 4', 4" and the opening of the closure flaps 5', 5" and 6', 6". It is optional that at least one of both additional drives X1, X2 for a potential ejection device X is mounted to the flap drive 9.

FIG. 6 shows the standstill drive 13 which enables a temporary standstill without changing the rotation direction or the rotational speed of the central drive 10. This standstill drive 13, which makes it possible that the collecting containers 4', 4" are not in movement at certain rotation angle ranges of the central drive 10, preferably generates a non-circular movement of point P.

Herein, the shaft W1 of the central drive 10 is firmly attached with a base 20. The base 20 is formed in the shape of a cross. By the rotation of the shaft W1 of the central drive 10, the base 20 rotates with an angular velocity $\omega_1$. At one end of the base 20, a roll R1 is mounted, which, however, is firmly connected with the underground and hence does not rotate with the angular velocity $\omega_1$. At the base 20, furthermore three further rolls R2, R3 and R4 are mounted, which are freely rotatable. Furthermore, the roll R3 is mounted a little bit shifted between the rolls R2 and R4. Furthermore, a rope or a strap 21 is stretched around the rolls R1, R2, R3 and R4. At the roll R3, a lever 22 is mounted, which is firmly connected with the roll R3. The lever 22 rotates with the angular velocity $\omega_4$ and can be connected with the pivoting drive 8 at the point P, for example with a lever.

FIG. 7 shows a motion path of the standstill drive 13 at the outermost point P of the lever 22 of FIG. 6. This motion path has a quasi-oval shape and is composed of two approximately semicircular and two basically straight segments. In the semicircular segments, a movement of the pivoting drive 8 takes place, whereas almost standstill of the pivoting drive 8 is present in the straight segments.

In a point A (in this case at approximately 330° of the rotation angle of the central drive 10), the pivoting drive 8 begins pivoting. The pivoting continues (also in point b), until approximately a point of 60° rotation angle of the central drive 10 is reached (point C). Here, the pivoting drive 8 stands still, wherein the central drive 10 can further rotate. Only when reaching a rotation angle of 120° of the central drive 10 (point D), the standstill drive 13 begins rotating again and driving the pivoting drive 8. When reaching a rotation angle of 240° of the central drive 10 (point E), the pivoting drive stands still again and only begins moving when reaching point A again.

In this way, it can be achieved that the central drive 10 can always rotate and thereby also simultaneously drive the pivoting drive 8 and the flap drive 9, wherein a movement of the pivoting drive 8 respectively only occurs for predetermined time spans.

Furthermore, desirably all bearings which are required for supporting of all axes and shafts are formed as ball bearings in the present invention. For the reduction of weight, all axes can be carried out as hollow axes. Furthermore, leg springs with adjustable pre-tension can be mounted for the support of the closing movement of the first closure flaps 5', 5" and second closure flaps 6', 6" in order to support the closing movement.

Furthermore, an adjusting of the lever length of the drive of the closure flaps can be preferably avoided. A clamping connection of the axis for the closure flaps compensates for this.

Furthermore, preferably the framework structure of the connection levers of the closure flaps leads to a lower mass despite higher stiffness. The design of one or more axes as hollow axes also contributes to this.

Furthermore, preferably the application of the forces for actuating of the closure flaps close to the center of gravity of the closure flaps leads to few retro-active effects in the system. Thereby, also a higher stiffness of the metal construction of the closure flaps can be realized.

Furthermore, the frame construction 17 can be carried out in box construction.

In an advantageous embodiment of at least one embodiment of the invention, as presented in FIGS. 3 and 4, the first closure flaps 5', 5" and second closure flaps 6', 6" can be opened by an additional drive in the receiving position (X1 and X2 in FIG. 3 and FIG. 4). X1 and X2 are required to eject erroneous ejections, which should not be ejected into the product receiving device 7, laterally (of the product receiving device 7)—i.e. in each arbitrary pivoting position of the collecting containers 4', 4". Herein, the additional drives X1 and X2 are adjusted for moving the lever 15 for moving the first closure flaps 5', 5" in addition to the cam disk 12 or the cardan joint 11. With an additional drive identical in construction, the lever 14 for moving the second closure flaps 6', 6" is moved. Furthermore, an actuation axis of the flap drive 9 can be realized with a system of levers via a clamping connection (inter alia framework structure construction 16, lever 15 for moving of the second closure flaps 6', 6", lever 14 identical in construction for moving the first closure flaps 5', 5"), whereby no separate adjusting steps of the tolerances caused by production are required, and those are compensated by a clamping connection of the actuating axis of the closure flaps 5', 5", 6', 6".

Such a system is used in a scale system, in particular in a combination scale.

The present invention is not limited to the above-mentioned embodiments.

For example, it is also possible to provide more than two product supply devices 3 and more than two collecting containers 4 in the product output device 1.

Furthermore, the number of the closure flaps 5', 5", 6', 6" is not limited to respectively two per collecting container 4', 4". Also, a system is possible in which four closure flaps form a closure of a collecting container 4', 4".

Furthermore, it is possible to provide more than one product receiving device 7 in the product output device 1.

Furthermore, also a product output device with more than one cardan joint 11 and more than one cam disk 12 is conceivable.

Furthermore, also a solution without the system of drives is conceivable. Each control device 25 designed in a different way could be used for the pivoting movement of the collecting containers 4', 4" and the opening of the first closure flaps 5', 5" and 6', 6".

Furthermore, it would be possible that the closure flaps (5', 5"; 6', 6") open via movement in the direction of the collecting containers (4', 4")—these would not be opened in a pivoting movement any more, but would slide along the collecting containers (4', 4") in an upward direction.

At least one embodiment of the present invention comprises a product output device for a product supply system, in which a first product supply device 3' and a second product supply device 3" provide product amounts in a first collecting container 4' and a second collecting container 4". Both collecting containers are provided with respective first closure flaps 5', 5" and second closure flaps 6', 6". As soon as the collecting containers 4', 4" are positioned above the product receiving device 7, the closure flaps 5', 5" and 6', 6" can open in order to drop the product into the product receiving device 7. The collecting container 4, comprising the first collecting container 4' and the second collecting container 4", can be pivoted to a output position of the first collecting container 4', S', or to an output position of the second collecting container 4", S". Herein, the pivoting movement to the respective different output positions (S' or S") begins before the closure flaps (5', 5" or 6', 6") have closed.

The invention claimed is:

1. A product output device for a product supply system, comprising
    a first product supply device with a respective first collecting container and a second product supply device with a respective second collecting container,
    wherein the collecting containers each comprise closure flaps at respective bottom side, and are adapted to output product amounts provided by the product supply system to a product receiving device, said product receiving device comprising a predetermined opening cross-section,
    wherein each collecting container is positionable in respectively one output position for outputting a provided product amount, in which its respective closure flaps are aligned in a middle position above the opening cross-section of the product receiving device,
    characterized in that the closure flaps are configured to move out of a pivoting path of the collecting containers by their opening movement.

2. A product output device according to claim 1, wherein an opening or a closing direction of the closure flaps around respective axes is perpendicular to a pivoting direction of the collecting containers around an axis.

3. A product output device according to claim 1, further comprising a control device, which is configured such that pivoting of the collecting containers of one output position into the other output position begins before the closing of the closure flaps of the collecting containers begins.

4. A product output device according to claim 3, wherein the control device comprises a pivoting drive, which is adapted to pivot the collecting containers, and a flap drive which is adapted to open or close the closure flaps, wherein the pivoting drive and the flap drive are coupled mechanically to a central drive.

5. A product output device according to claim 4, wherein the central drive and the flap drive are connected with each other via at least one cardan joint.

6. A product output device according to claim 4, wherein the central drive and the flap drive are connected to each other via at least one cam disk.

7. A product output device according to claim 4, wherein the pivoting drive is a standstill drive, by which the collecting containers are not moving in certain rotation angle ranges, wherein the standstill drive generates a noncircular movement.

8. A product output device according to claim 1, further comprising at least one framework structure construction for movement of the closure flaps of the collecting containers.

9. A product output device according to claim 4, wherein at least one additional drive for an ejection device is connected to the flap drive, and the additional drive is adapted to cause a movement of the closure flaps in each desired pivoting positions of the collecting containers.

10. A product output device according to claim 1, which is adapted to introduce a force for the actuation of the closure flaps of the collecting containers close to the center of gravity of the closure flaps.

11. A product output device according to claim 1, further comprising torsion springs with adjustable pre-tension, which are adapted to support the closing movement of the closure flaps of the collecting containers.

12. A product output device according to claim 1, wherein at least one of the axes is designed as a hollow axis.

13. A process for the actuation of the product output device of claim 1 comprising pivoting of the collecting containers from one output position into another output position begins before closing of the closure flaps of the collecting containers begins.

* * * * *